(12) United States Patent
Ko et al.

(10) Patent No.: US 7,572,024 B2
(45) Date of Patent: Aug. 11, 2009

(54) VARIABLY-ADJUSTABLE GRILL LIGHT AND METHOD OF USE THEREOF

(75) Inventors: Wai-Shing Peter Ko, Peachtree City, GA (US); Jon Eric Gibson, Oxford, GA (US)

(73) Assignee: Elumx, LLC, Fayetteville, GA (US)

( * ) Notice: Subject to any disclaimer, the term of this patent is extended or adjusted under 35 U.S.C. 154(b) by 39 days.

(21) Appl. No.: 11/872,926

(22) Filed: Oct. 16, 2007

(65) Prior Publication Data

US 2009/0097263 A1    Apr. 16, 2009

(51) Int. Cl.
*F27D 21/02* (2006.01)
(52) U.S. Cl. .................. 362/92; 362/191; 362/287; 362/427; 362/253; 362/396; 126/25 R; 126/213
(58) Field of Classification Search .................. 362/92, 362/190, 191, 197–199, 253, 285, 287, 418, 362/427; 126/25 R, 41 R, 213
See application file for complete search history.

(56) References Cited

U.S. PATENT DOCUMENTS

| | | | | |
|---|---|---|---|---|
| 3,851,166 | A | * | 11/1974 | Kohler .................. 362/198 |
| 4,045,808 | A | * | 8/1977 | King .................. 396/155 |
| 4,051,493 | A | * | 9/1977 | Nakagawa et al. .......... 396/155 |
| 5,257,169 | A | | 10/1993 | Walendziak |
| 5,424,931 | A | * | 6/1995 | Wheeler .................. 362/418 |
| 6,073,623 | A | | 6/2000 | Maschhoff |
| 6,132,055 | A | | 10/2000 | Grisamore et al. |
| D464,754 | S | | 10/2002 | Cavins |
| 6,851,820 | B2 | | 2/2005 | Choi et al. |
| 6,935,327 | B1 | | 8/2005 | Williams et al. |
| 7,008,072 | B2 | | 3/2006 | Witzel et al. |
| 7,222,620 | B2 | | 5/2007 | Wolter et al. |
| 7,309,137 | B2 | * | 12/2007 | Chan .................. 362/184 |
| 2003/0179572 | A1 | * | 9/2003 | Schnell .................. 362/191 |

* cited by examiner

*Primary Examiner*—Thomas M Sember
(74) *Attorney, Agent, or Firm*—Williamson Intellectual Property Law, LLC; Thomas R. Williamson, III

(57) ABSTRACT

A variably-adjustable grill light with a lamp portion having pitch, roll and/or yaw adjustability, along with a telescopic arm, wherein the grill light can be installed and then selectively adjusted without the need for removal so that it will shine on any selected portion of the grill, or, alternately, the lamp portion can be removed without removing the clamp from the handle for portable use or to shine on other surfaces. This provides a grill user with the ability to easily see the condition of the food being cooked and provides visibility during application of spices, sauces or other condiments.

18 Claims, 9 Drawing Sheets

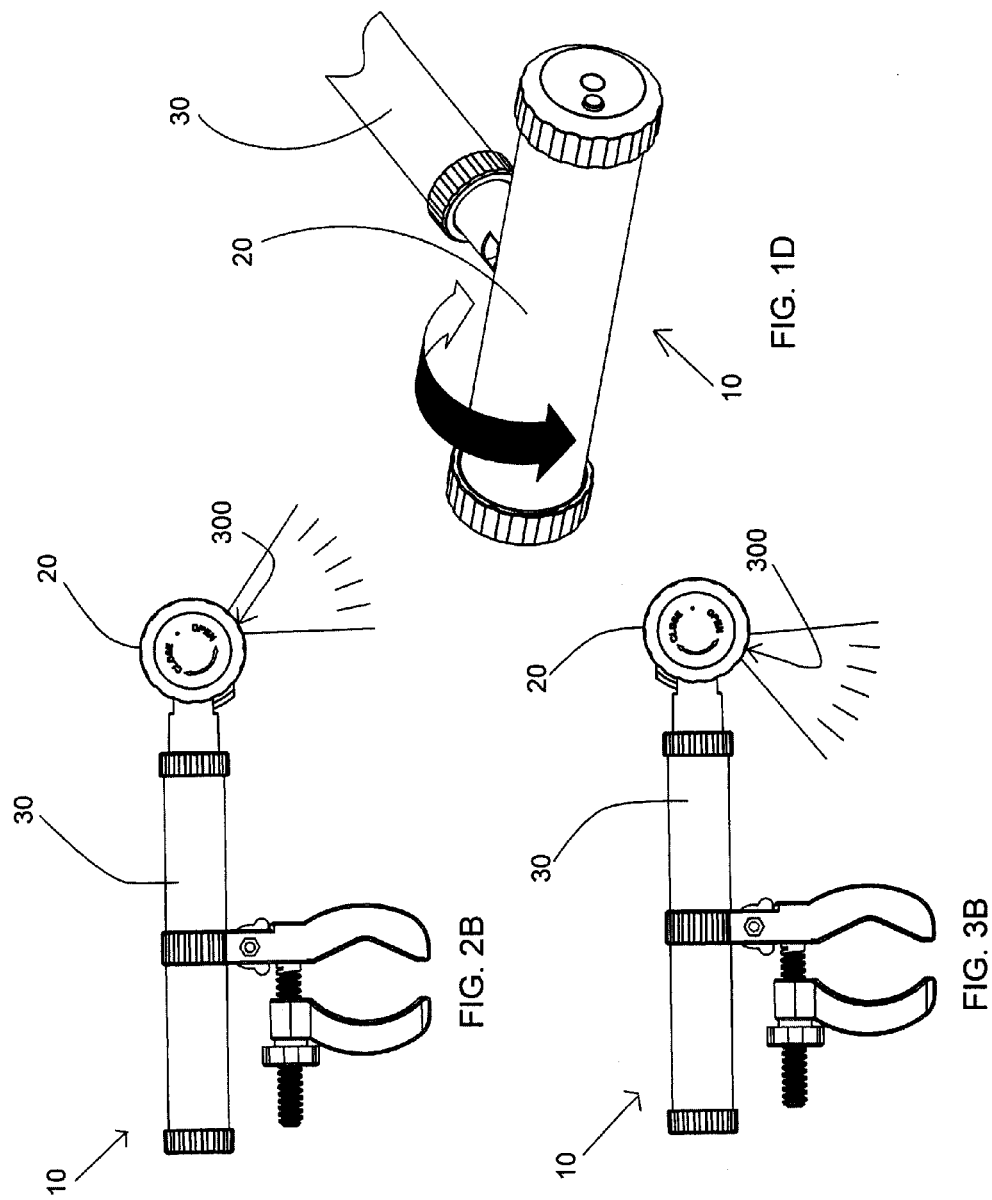

VARIABLY-ADJUSTABLE GRILL LIGHT AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to lighting devices, and more specifically to a variably-adjustable grill light and method of use thereof, wherein the grill light attaches to the grill handle, and wherein the grill light may be adjusted to irradiate a selected area of the grill.

2. Description of Related Art

It is commonplace during favorable weather, such as typically exists during Summer, to cook and prepare food outdoors. Ofttimes, such cooking takes place on a grill device, wherein the heat for cooking is typically provided by charcoal or gas fuel. Being outside and lacking electrical power supply, such grill devices are typically illuminated solely by the flame from the fuel source. Such cooking further often takes place during evening dusk or dark hours, wherein it is difficult to clearly see food that is placed upon the rack of the grill, making it difficult to determine the condition of the food being cooked and to manipulate food securely. Further, during preparation of food and cooking thereof, spices, sauces or other condiments are often applied to the food and it is desirable to be able to clearly see the food in order to apply such in a desired location.

Most grill lights for attachment to a grill that exist in the market are limited in their application. For example, some must be secured to flat surfaces around the grill, some will only work with a straight bar handle, some will not provide much ability to be aimed at the grilling surface, and some require the replacement of the entire handle with a built-in light source.

One such device comprises a light component as part of the handle of the grill, and thus cannot easily be used to retrofit existing grills without modification or provision of openings in the cover of the grill. For instance, when combined handle and light assembly requires a channel for the appropriate wiring to extend from a separate energy compartment and illumination source, thereby to permit illumination within the lid portion of the grill.

Another device is operable from a stored position to a position in which it illuminates the cooking surface of the grill; however, the light only shines in alignment with the cooking surface, and does not permit light being directed where desired. Yet another device comprises a fixed light wherein the light is disposed such that it will irradiate cooking surface when the lid is open. Still another device utilizes different switches to selectively irradiate different portions of a grill surface and another device comprises selective illumination of bulb is powered by rechargeable batteries charged by a generator, but is fixed in position below the handle of the grill.

The above devices lack the ability to be positioned where desired and for the most part are not removable from the grill and thus cannot be readily fitted to existing grills that lack lighting. Further, the above devices do not provide the ability to be redirected to an internal rack that is often an additional component of a grill usually located towards the rear of the grilling surface. Lastly, where it is even possible to remove such grill lights, they must be completely removed from the grill to be utilized elsewhere. Subsequent to removal, they must be carefully repositioned to be able to provide light in the originally-desired location.

Various attempts been made to provide devices that can be removably attached to different locations on a grill. One such device comprises a spring clip attached to a light and thus it can be maneuvered into a position so long as the spring clip has a flat surface to grip on. Another such device comprises a bolt-on rotatable light assembly that is mounted by drilling a hole through the lid of the grill. Finally, yet another device comprises a lighting assembly at the end of a pivotal hinged arm that can be swung out from the handle of the grill, wherein a pivoting head is then directed at the grill surface. Due to the nature of such pivoting arms, the head is not readily positionable over all portions of the grill grate surface, and further is not susceptible to directing at the internal rack that accompanies many grills.

Therefore, it is readily apparent that there is a need for a variably-adjustable grill light that can be selectively positioned over the grill grate surface and which can be selectively directed at the entire grill grate surface and/or the internal rack of a grill, can be easily detached from the mounting apparatus to illuminate other areas and which may readily be utilized in locations apart from the grill.

BRIEF SUMMARY OF THE INVENTION

Briefly described, in a preferred embodiment, the present invention overcomes the above-mentioned disadvantages and meets the recognized need for such a device by providing a variably-adjustable grill light with a lamp portion having pitch, roll and possibly yaw adjustability, along with a telescopic arm, wherein the grill light can be installed and then selectively adjusted without the need for removal so that it will shine on any selected portion of the grill, or removed so that it can shine on other surfaces. This provides a grill user with the ability to easily see the condition of the food being cooked and visibility during application of spices, sauces or other condiments. Further, when desired, the grill light may be easily separated from its mount, facilitating its hand-held use away from the grill. Thus, temporary use of the grill light is possible in other locations, such as, for exemplary purposes only, to shine light on the ground below the grill.

According to its major aspects and broadly stated, the present invention in its preferred form is a variably-adjustable grill light having a clamp for securing to a grill surface, such as, for exemplary purposes only, a grill handle, wherein the clamp retains a telescopic shaft at the other end of which is a lamp head. The lamp head is secured to the telescopic shaft via a rotationally slidable fastener to permit pitch adjustment so that the light can be directed on the grill or inwardly toward the grill lid wherein an internal rack is illuminated. An alternate embodiment of the present invention has the lamp head secured to the telescopic shaft via a ball and socket joint to permit pitch, roll and yaw adjustment. The lamp head is also adjustable by rotation around the long axis of the telescopic extension, thereby providing roll adjustment to direct the light to either side. The telescopic extension provides the ability to retract behind the lip of the grill lid when not in use, or extend the lamp head beyond the front lip of the grill lid when in use. The telescopic extension is secured via a clamp having fixed and moveable jaws having generally arcuate shape, wherein the jaws are tightened to secure the grill light to any suitable surface of the grill.

The lamp head may be selectively removed from the telescopic shaft by separation of the rotationally slidable fastener, wherein the telescopic shaft and clamp portions remain attached to the grill, while the lamp head may be utilized in other locations, even remote from the grill. The clamp can be attached anywhere along the length of the telescopic extension to mount to grills with handles mounted closer or farther from the front lip of the grill lid.

More specifically, the present invention is a variably-adjustable grill light with a lamp portion having pitch, roll and alternatively yaw adjustability and a telescopic extension. The lamp portion is disposed at a first end of the telescopic extension member. The first end and the lamp portion engage via a rotationally-slidable fastener that provides pitch adjustability of the lamp portion, in order that illumination may be directed onto the grill surface or inward towards the grill lid where it can shine on an internal rack of the grill. Pitch adjustability comprises rotation of the lamp portion around its long axis via sliding of a rotationally-slidable fastener. The lamp may also be adjusted by rotation of the lamp portion around the long axis of the telescopic extension, known as roll adjustability. In the preferred embodiment of the variably-adjustable grill light, the lamp portion long axis and the telescopic extension long axis are perpendicular to one another. In an alternative embodiment, the lamp may also be rotated about a vertical axis through the centerline of the joint with the use of a ball joint facilitating yaw adjustment.

The rotationally-slidable fastener comprises an 'I' track on the lamp portion and a 'C' retainer at the first end of the telescopic extension, wherein the 'C' retainer cooperatively engages the 'I' track, such that the 'C' retainer and 'I' track are operatively associated to permit slidable rotation of the lamp portion to a selected position relative to the telescopic extension. The 'I' track may be separated from the 'C' retainer by rotation of the lamp head, wherein the telescopic extension and associated mounting components remain securely attached to the grill, while the lamp head may be utilized remotely. Thus, when desired, it is possible to utilize the lamp head to provide light to facilitate location of objects dropped below the grill, to provide light to a different location on the grill, or even to provide light by transport of the lamp head to locations apart from the grill. Finally, the lamp head may be reinstalled upon the telescopic shaft to provide light in the exact originally-chosen location without the need for adjustment of the mounting components.

The variably-adjustable grill light further comprises a mounting clamp that is slidably disposed on the telescopic extension member at a second end thereof. The clamp has a band tightener that frictionally engages a slidable surface of the second end of the telescopic extension, such that once a selected position has been chosen, the band is tightened, securing the clamp in position for purposes of accommodating handles of varying off-set or distance from the edge of the grill lid. The clamp has two opposing jaws, a fixed jaw and a movable jaw. The movable jaw is secured by a nut that threadedly engages a threaded rod upon which the movable jaw is disposed. The fixed and movable jaws are arcuately shaped to facilitate fastening to either a cylindrical cross-section grill handle, a rectangular cross-section grill handle or any other appropriately shaped irregular handle.

The lamp portion has a timer to control the period during which said variably-adjustable grill light is illuminated and comprises a battery compartment therewithin, while the telescopic extension may comprise a storage compartment.

In order to use the variably-adjustable grill light, the grill light is removably secured via its clamp on a portion of the grill, such as, for exemplary purposes only, the handle portion of the grill, wherein the handle may be of cylindrical or rectangular cross-section or of any other irregular shape. It will be recognized by those skilled in the art that other fasteners could be utilized to secure the grill light to a grill without departing from the spirit of the present invention. Subsequent to securing on the grill, the grill light lamp portion is aimed at a selected portion of the grill surface, such as at the grill grate, or alternately, inward towards the grill lid, thereby to shine on an internal rack if the grill is so equipped. Aiming is accomplished by adjusting the pitch, roll and, alternately, yaw of the lamp portion and by extending the lamp portion via adjustment of the telescopic extension.

The variably-adjustable grill light provides a grill user with a light source that is readily adjustable to shine on any desired surface of a grill, and that once installed, can be further adjusted without removal, thereby providing the user with the ability to see the condition of food on the grill surface or grate and to apply any desired condiments or sauces to the food with accuracy, or the lamp head can be removed without removing the mounting clamp to illuminate other areas including but not limited to the underside of the grill, fuel tanks, auxiliary burner tables, temperature control knobs or serving tables, or for use as a personal flashlight to assist in nighttime navigation Accordingly, a feature and advantage of the present invention is its ability to easily accommodate different sizes and shapes of grill handles.

Another feature and advantage of the variably-adjustable grill light is its ability to provide secure attachment to a grill without scratching or damaging the grill handle.

Yet another feature of the variably-adjustable grill light is the adjustable clamp mounting location along the extension bar to accommodate handles of varying distances from the edge of the grill lid.

An additional feature and advantage of the variably-adjustable grill light is that it conserves energy via the automatic shutoff of light after a preprogrammed time.

Another feature of the variably-adjustable grill light is that the removable lamp head can be removed from the extension bar without removing the mounting clamp from the grill handle.

Still another feature and advantage of the variably-adjustable grill light is its ability to securely attach to any profile grill handle including cylindrical and rectangular.

Yet another feature and advantage of the variably-adjustable grill light is its ease of adjustment without any tools.

Yet still another feature and advantage of the variably-adjustable grill light is retractable design, thereby facilitating storage when not in use.

A further feature and advantage of the variably-adjustable grill light is its ability to be adjusted in three dimensions.

Yet an additional feature and advantage of the variably-adjustable grill light is that its lamp head may be separated from its mounting components for use elsewhere, or for temporary shining of light on a different location of the grill.

These and other features and advantages of the variably-adjustable grill light will become more apparent to one skilled in the art from the following description and claims when read in light of the accompanying drawings.

BRIEF DESCRIPTION OF THE SEVERAL VIEWS OF THE DRAWINGS

The variably-adjustable grill light will be better understood by reading the Detailed Description of the Preferred and Selected Alternate Embodiments with reference to the accompanying drawing figures, in which like reference numerals denote similar structure and refer to like elements throughout, and in which:

FIG. 1D is a perspective view of a lamp head portion of a preferred embodiment of a variably-adjustable grill light, depicting rotation of the lamp portion;

FIG. 2B is a side view of a variably-adjustable grill light according to a preferred embodiment, shown with light directed forward;

FIG. 3B is a side view of a variably-adjustable grill light according to a preferred embodiment, shown with light directed backward;

Figure 1A:
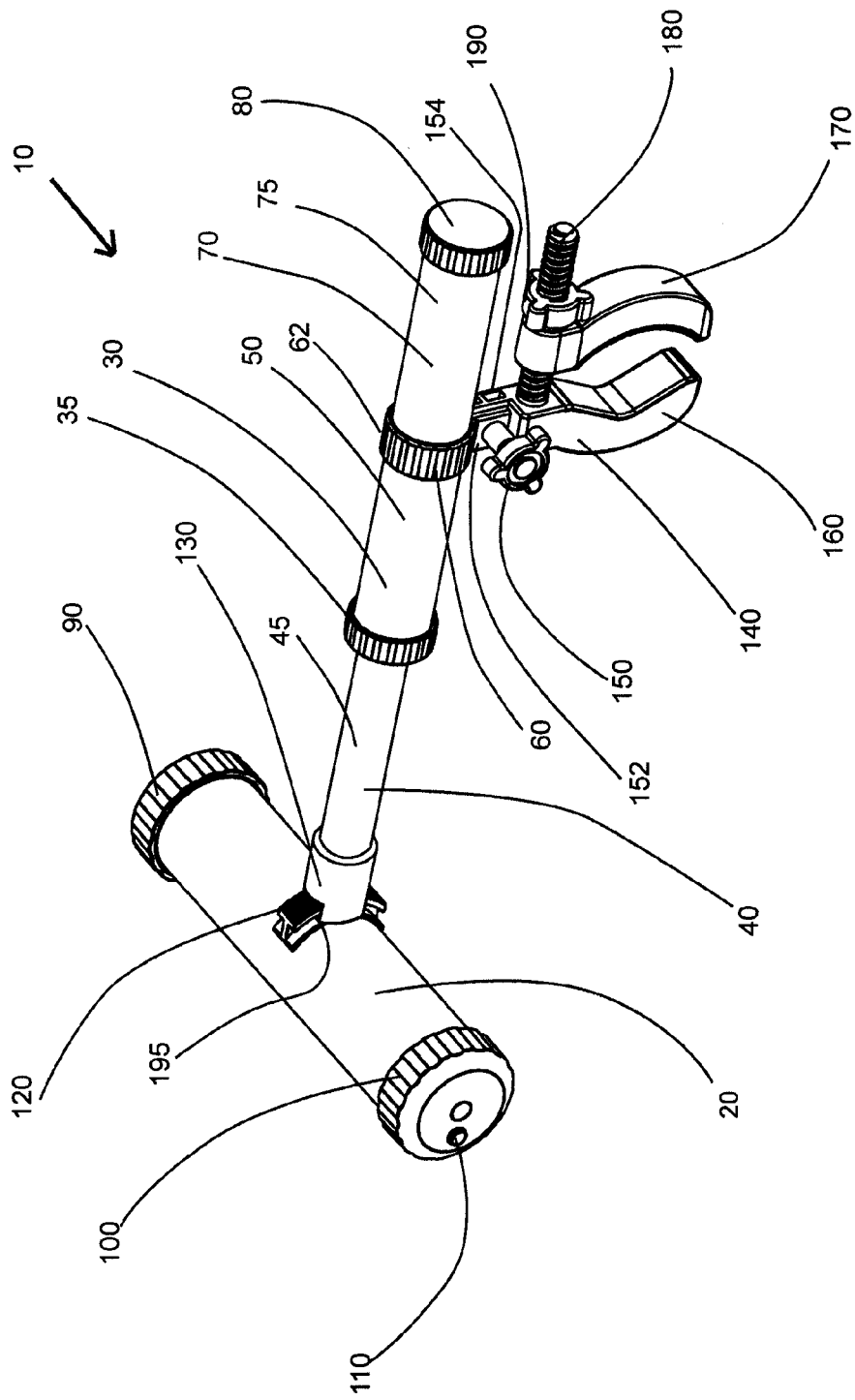
FIG. 1A is a perspective view of a variably-adjustable grill light according to a preferred embodiment.
Figure 1B:
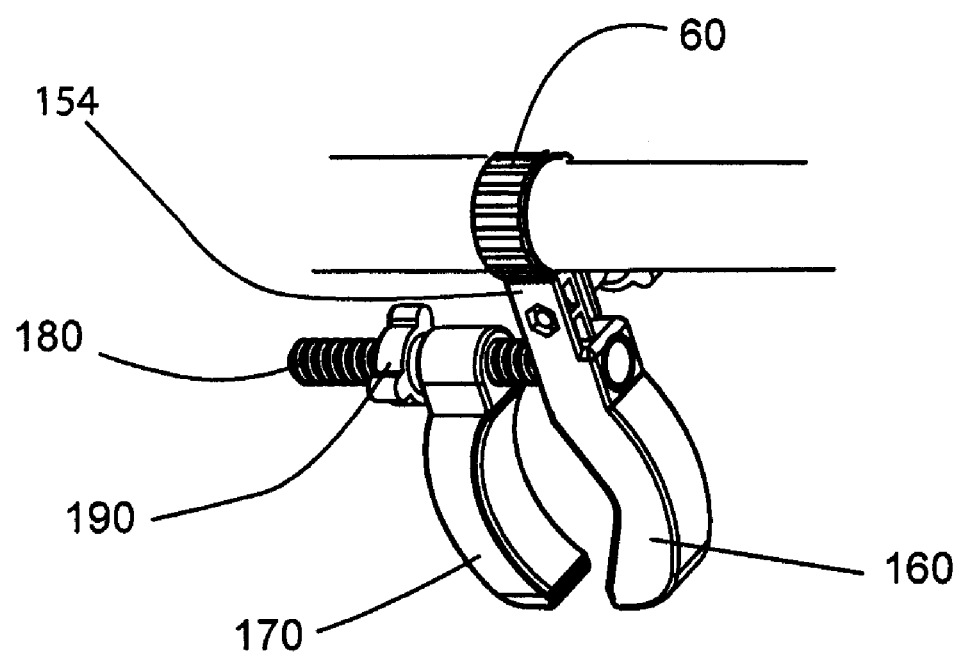
FIG. 1B is a detail perspective view showing the clamp portion of a variably-adjustable grill light according to a preferred embodiment.
Figure 1C:
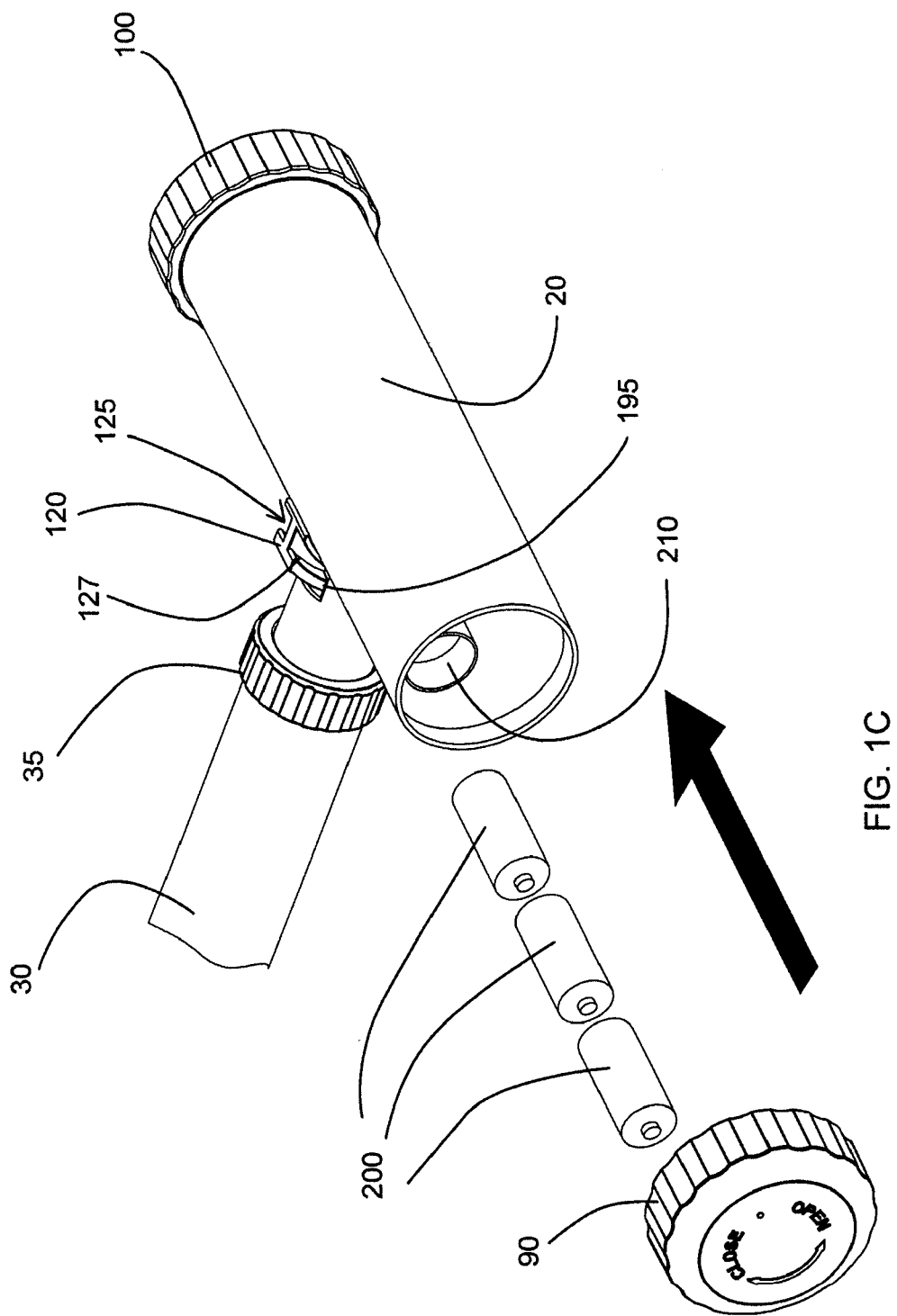
FIG. 1C is a perspective view of a lamp head portion of a preferred embodiment of the variably-adjustable grill light, with end cap removed to show battery compartment.
Figure 1E:
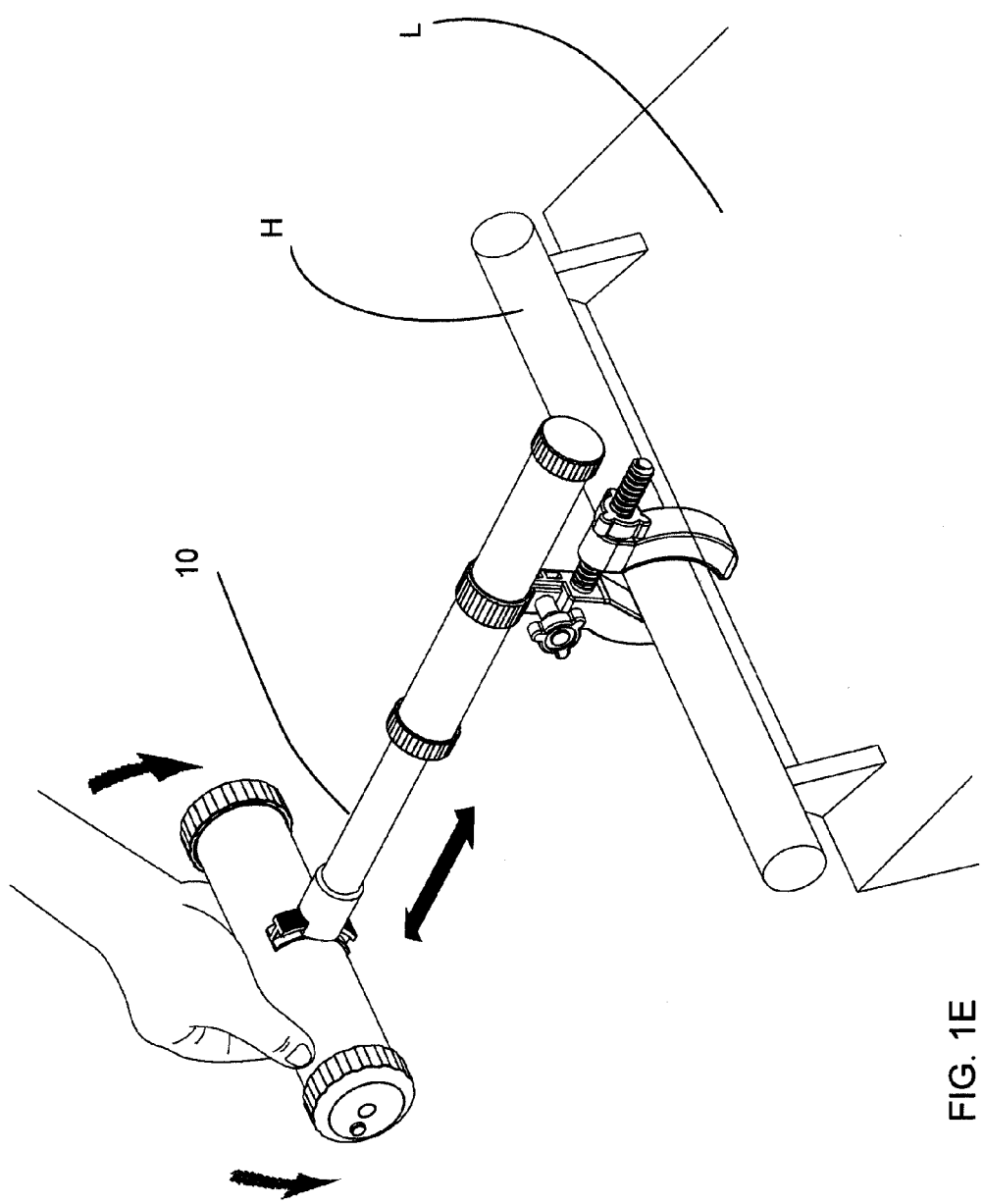
FIG. 1E is a perspective view of a preferred embodiment of a variably-adjustable grill light shown attached to a cylindrical handle of the grill, depicting adjustment and aiming of the lamp portion.
Figure 1F:
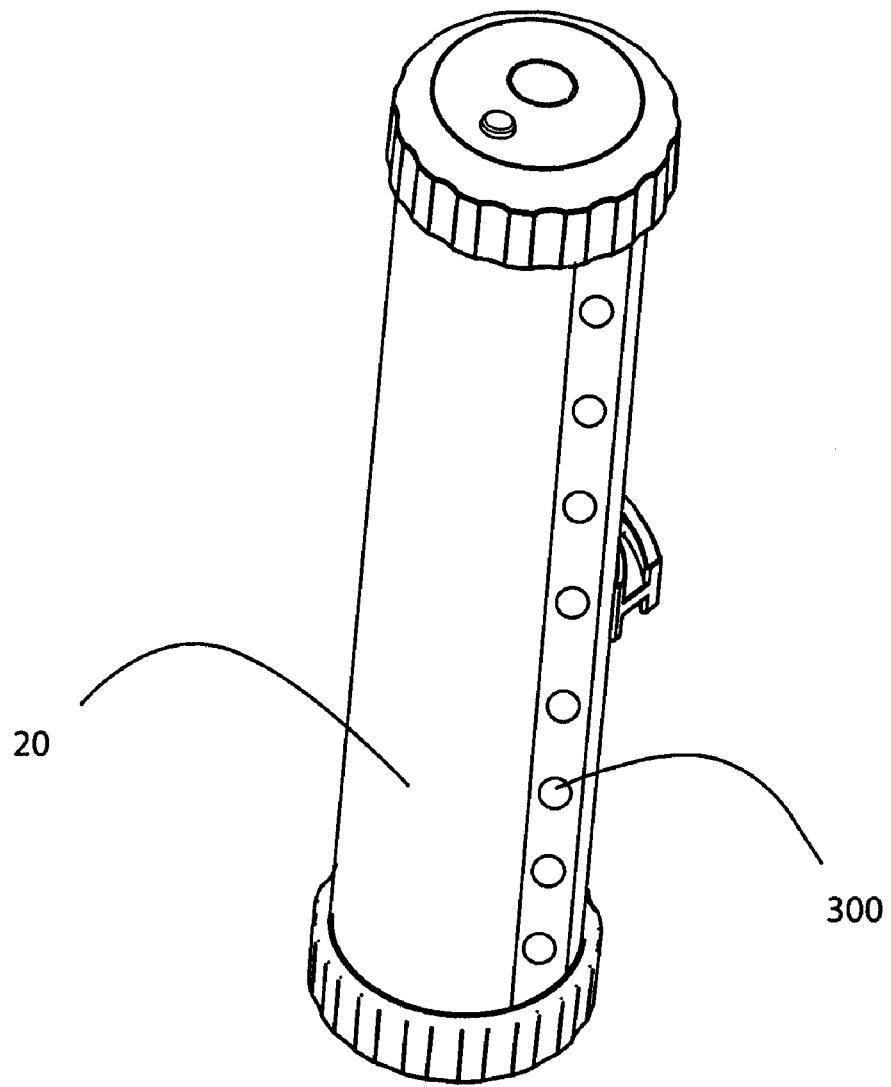
FIG. 1F is a bottom view of the separated lamp portion showing the light source according to a preferred embodiment of a variably-adjustable grill light.
Figure 3A:
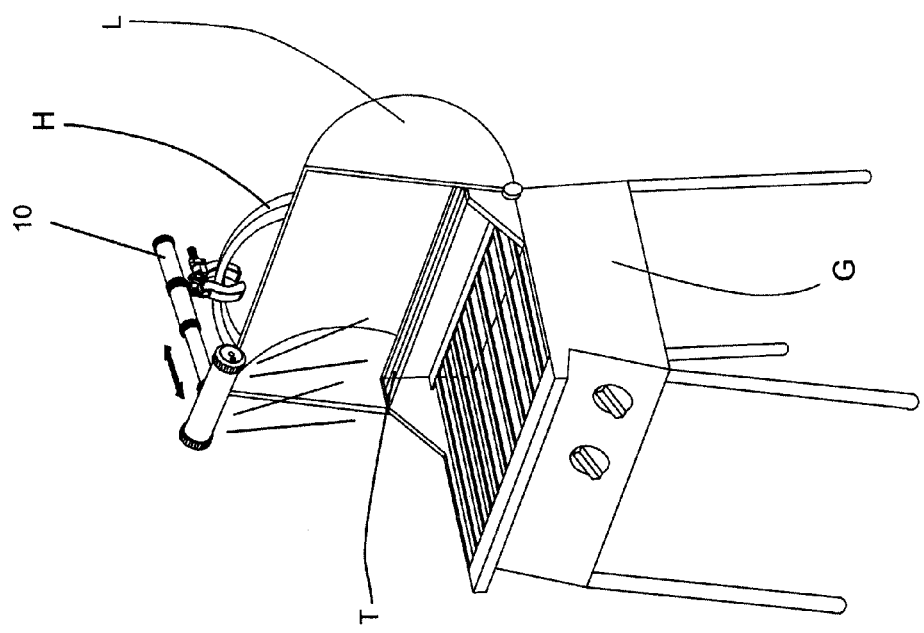
FIG. 3A is a perspective view of a grill with stylized rectangular profile handle shown with a variably-adjustable grill light according to a preferred embodiment installed thereon illuminating inside the grill lid and any interior portions.
Figure 2A:
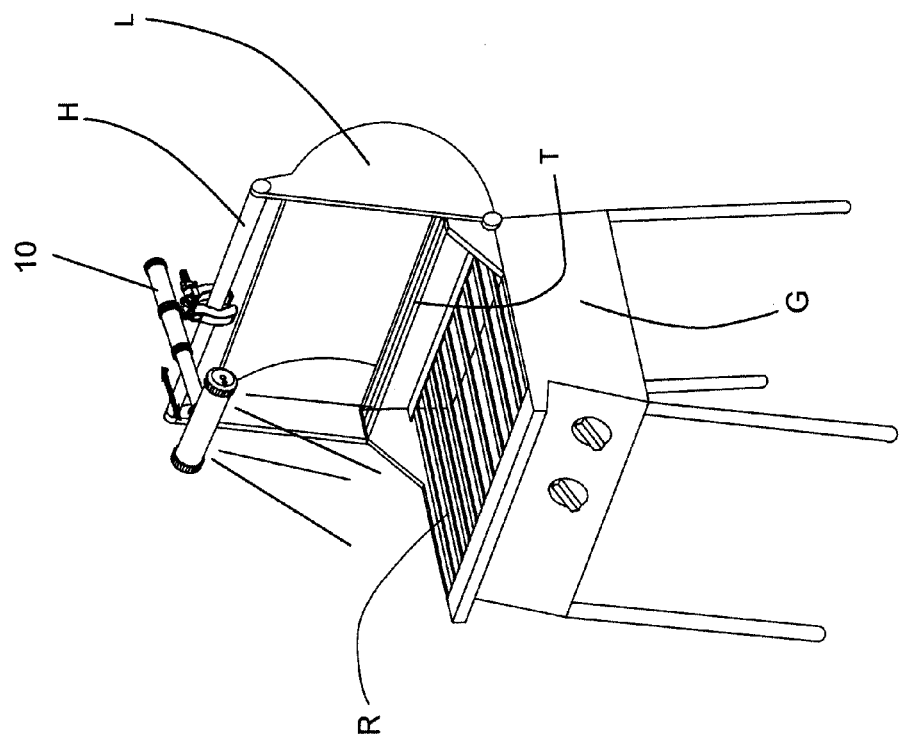
FIG. 2A is a perspective view of a grill with cylindrical handle shown with a variably-adjustable grill light according to a preferred embodiment of a variably-adjustable grill light installed thereon illuminating the grill surface.
Figure 4:
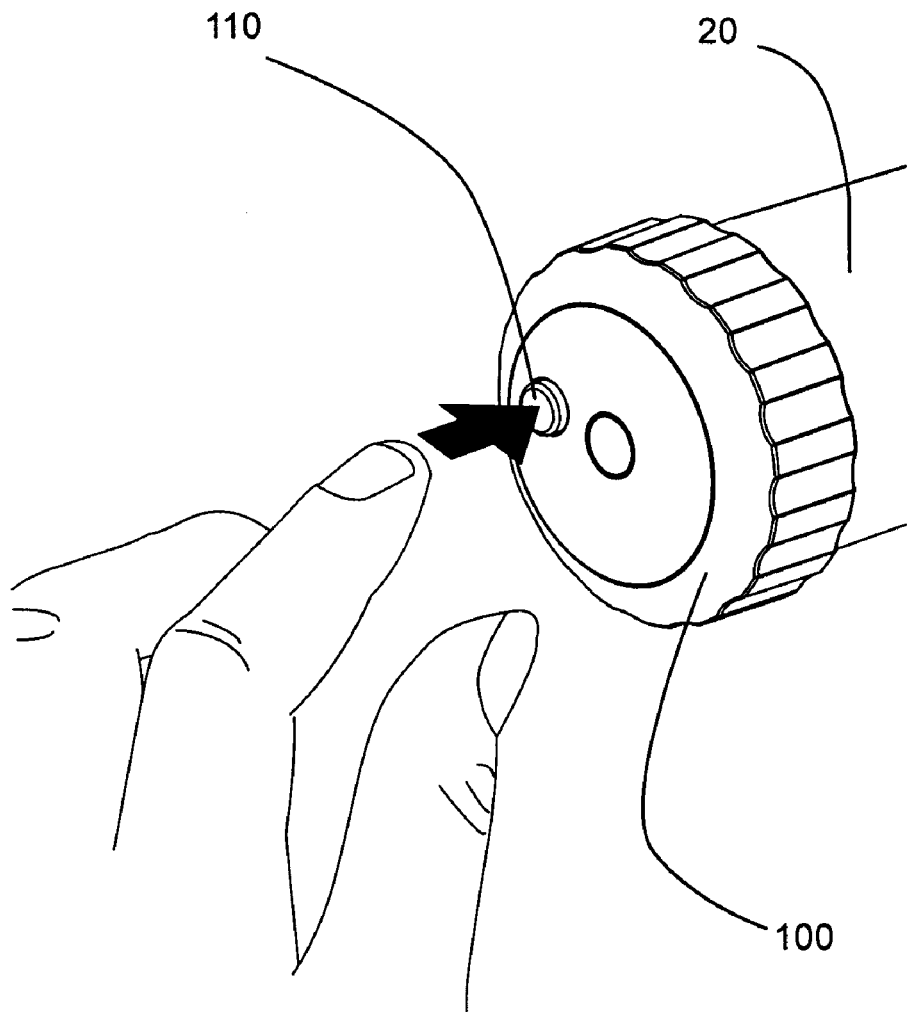
FIG. 4 is a perspective view of an end cap portion of a preferred embodiment of a variably-adjustable grill light, illustrating a timer switch.

DETAILED DESCRIPTION OF THE PREFERRED AND SELECTED ALTERNATE EMBODIMENTS OF THE INVENTION

In describing the preferred and selected alternate embodiments of the present invention, as illustrated in FIGS. 1A-5, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1A-4, the present invention in a preferred embodiment is variably-adjustable grill light 10, wherein grill light 10 comprises lamp 20, telescopic extension 30 and mount 60. Telescopic extension 30 comprises stop 35, inner arm member 40 and outer arm member 50, wherein inner arm member 40 slidably engages outer arm member 50, thereby to facilitate selective lengthening or shortening of telescopic extension 30. Stop 35 is any telescopic tube securing device as such is known in the art, wherein stop 35 prevents inner arm member 40 from being removed from outer arm member 50 to permit selective positioning of lamp 20 (best shown in FIG. 1E). Stop 35 further prevents wobble of inner arm 40/outer arm member 50, thereby providing rigidity to telescopic extension 30 It will be recognized by those skilled in the art that other methods of securing inner arm member 40 and outer arm member 50 may be utilized without departing from the spirit of the present invention. Mount 60 comprises clamp band 62 and clamp 140, flange 152, arm 154, wherein clamp 140 comprises band tightener 150, fixed jaw 160, movable jaw 170, threaded rod 180 and nut 190, wherein band tightener 150 passes through flange 152 and threadedly engages arm 154. Clamp band 62 is slidably secured to surface 70 of telescopic extension 30, wherein mount 60 is selectively adjustable along length of outer arm member 50, and wherein tightening of band tightener 150 frictionally engages surface 70, and wherein mount 60 is secured at any selected location along telescopic extension 30, thereby selectively shortening or lengthening grill light 10 (best shown in FIG. 1E).

Lamp 20 comprises switch/timer 110, timer access 100, battery cover 90 and light source 300, wherein lamp 20 is disposed at first end 45 of telescopic extension 30, and wherein first end 45 comprises 'C' shaped retainer 130. Lamp 20 further comprises 'I' track 120, wherein channels 125, 127 of 'I' track 120 cooperatively engage ridges 195 of 'C' shaped retainer 130, and wherein lamp 20 is rotatable around its long axis via sliding engagement of 'I' track 120 with 'C' shaped retainer 130, thereby providing pitch adjustment of lamp 20 (best shown in FIG. 1E).

Light source 300 comprises any known lighting source, such as, for exemplary purposes only and without limitation, incandescent bulbs, fluorescent bulbs and/or light emitting diodes. Switch/timer 110 is depressed to turn light source 300 on, wherein switch/timer 110 is depressed for switching or held in for a selected period to activate timing mode. Access via timer access 100 permits selective adjustment of period of lamp illumination, wherein the preferred period is fifteen minutes. Cap 80 is disposed at second end 75 of telescopic extension 30, wherein cap 80 provides access to outer arm member 50 for storage, and wherein small items are selectively secured within telescopic extension 30.

In use, grill light 10 is secured to handle H of grill G via clamp 140 by moving movable jaw 170 on threaded rod 180 toward fixed jaw 160 to engage handle H, and subsequently securing movable jaw 170 via tightening of nut 190 on threaded rod 180. After securing clamp 140 to grill G, telescopic extension 30 is selectively slidably disposed within clamp band 62 and is adjusted by varying the position of mount 60 along telescopic extension 30, wherein clamp band 62 is subsequently tightened around telescopic extension 30 via band tightener 150, wherein band tightener 150 presses flange 152 against arm 154, thereby reducing the diameter of clamp band 62 and securing telescopic extension 30 via frictional engagement of clamp band 62 with surface 70 of telescopic extension 30. Further extension of grill light 10 is accomplished by selectively positioning inner arm member 40 within outer arm member 50 and securing arm member 40, 50 via stop 35.

Rotation of lamp portion 20 (pitch adjustment) facilitates shining of light from light source 300 onto grate R or into lid L to illuminate internal rack T.

In an alternate embodiment of variably-adjustable grill light 10, first end 45 could comprise a pivot or ball joint to permit yaw adjustment of grill light 10. Yaw adjustment permits additional flexibility of aiming of grill light 10.

Figure 5:
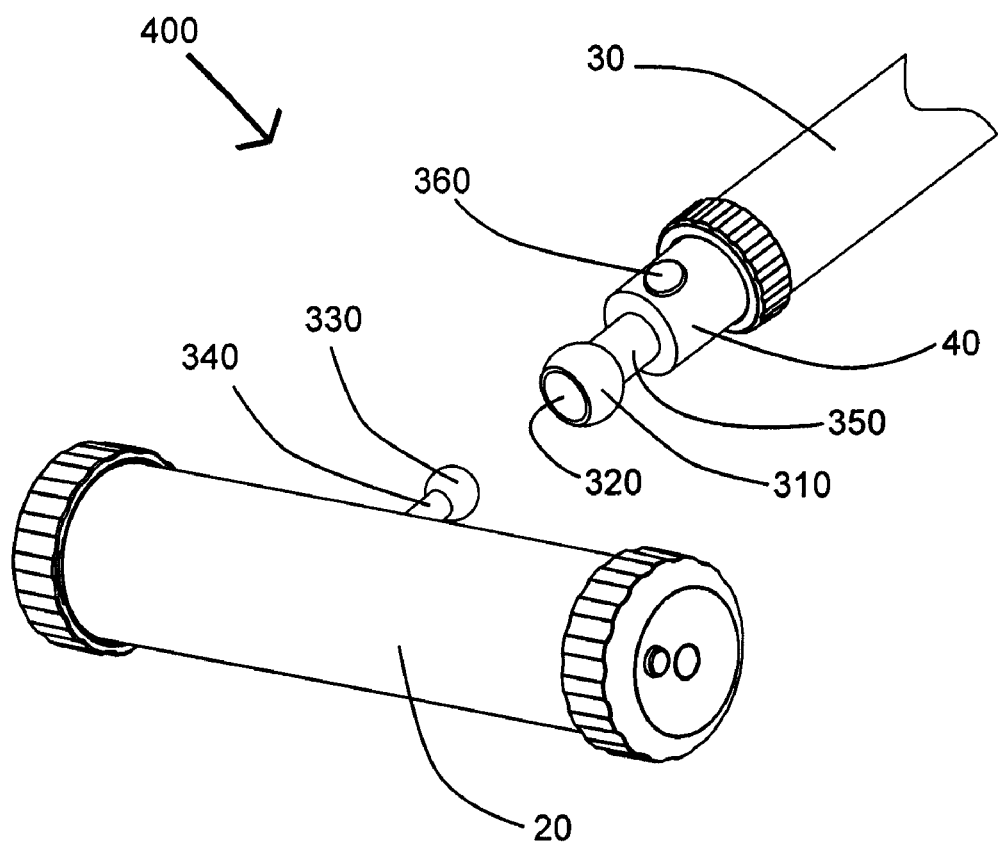
FIG. 5 is an exploded perspective view of a variably-adjustable grill light according to an alternate embodiment of the present invention.

Referring now more specifically to FIG. 5, illustrated therein is an alternate embodiment of variably-adjustable grill light 10, wherein the alternate embodiment of FIG. 5 is substantially equivalent in form and function to that of the preferred embodiment detailed and illustrated in FIGS. 1-4 except as hereinafter specifically referenced. Specifically, the embodiment of FIG. 5 comprises variably-adjustable grill light 400, wherein variably-adjustable grill light 400 comprises lamp portion 20, inner arm member 40 and telescopic extension 30, wherein lamp portion 20 comprises ball 330, wherein ball 330 is secured to lamp portion 20 via first post 340, and wherein inner arm member 40 comprises detent button 360 and socket 310 having aperture 320, and wherein socket 310 is in communication with inner arm member 40 via second post 350.

Typically during use, second post 350 is disposed within inner arm member 40, wherein second post 350 is secured within inner arm member 40 via detent button 360, wherein activation of detent button 360 releases second post 350 from inner arm member 40. Detent button 360 is such as is known in the art for releasing/retaining a post from/within a hollow arm member. In operation, lamp head 20 is swiveled in any aspect of pitch, yaw or roll about ball 330 for aiming light in a selected direction. Alternately, lamp portion 20 is removed from telescopic extension 30 by depressing detent button 360 so that lamp portion 20 may be utilized separately. Reinstallation is achieved by inserting second post 350 again into inner arm member 40, wherein detent button 360 engages and retains second post 350, thereby returning lamp portion 20 secured to grill G via telescopic extension 30.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A variably-adjustable grill light comprising:
a lamp portion having;
pitch and roll adjustability;
a telescopic extension member, wherein said lamp portion is disposed at a first end of said telescopic extension member; and
a rotationally-slidable fastener, wherein said rotationally-slidable fastener facilitates said pitch adjustability, and wherein said rotationally-slidable fastener comprises an 'I' track and a 'C' retainer, wherein said 'C' retainer cooperatively engages said 'I' track, and wherein said 'C' retainer and said 'I' track are operatively associated, and wherein said 'C' retainer is selectively slidably disposed along said 'I' track.

2. The variably-adjustable grill light of claim 1, further comprising yaw adjustability.

3. The variably-adjustable grill light of claim 2, further comprising a ball joint fastener, wherein said ball joint fastener facilitates said pitch, yaw and roll adjustability.

4. The variably-adjustable grill light of claim 1, further comprising a clamp, wherein said clamp is slidably disposed on said telescopic extension member at a second end thereof.

5. The variably-adjustable grill light of claim 4, wherein said clamp comprises a band tightener, and wherein said band tightener frictionally engages a slidable surface of said second end, whereby grill handles with varying offset or mounting distance from a front edge of a grill lid are accommodated.

6. The variably-adjustable grill light of claim 4, wherein said clamp comprises opposing jaws.

7. The variably-adjustable grill light of claim 6, wherein said opposing jaws comprise a fixed jaw and a movable jaw.

8. The variably-adjustable grill light of claim 7, wherein said movable jaw is secured via a nut, and wherein said nut threadedly engages a threaded rod upon which said movable jaw is disposed.

9. The variably-adjustable grill light of claim 7, wherein said fixed jaw and said movable jaw comprise an arcuate shape.

10. The variably-adjustable grill light of claim 1, wherein said lamp portion comprises a battery compartment therewithin.

11. The variably-adjustable grill light of claim 1, further comprising a timer, wherein said timer controls the period during which said variably-adjustable grill light is illuminated.

12. A method of illuminating a grill, said method comprising the steps of:
obtaining a variably-adjustable grill light comprising a lamp portion having pitch and roll adjustability and a telescopic extension; member and a rotationally-slidable fastener comprising an 'I' track and a 'C' retainer, wherein said 'C' retainer cooperatively engages said 'I' track, and wherein said 'C' retainer and said 'I' track are operatively associated, and wherein said 'C' retainer is selectively slidably disposed along said 'I' track, and wherein said lamp portion is disposed at a first end of said telescopic extension member;
facilitating said pitch adjustability via said a rotationally-slidable fastener;
removably securing said variably-adjustable grill light on a portion of the grill
aiming said lamp portion; and
illuminating a selected area.

13. The method of claim 12, wherein said step of removably securing comprises removably attaching said variably adjustable grill light to a handle portion of the grill.

14. The method of claim 12, wherein said step of removably securing comprises securing said variably adjustable grill light to a handle having a cross-section selected from the group consisting of cylindrical cross sections, rectangular cross-sections, irregularly-shaped cross-sections, and combinations thereof.

15. The method of claim 12, wherein said wherein said step of aiming further comprises adjusting yaw of said lamp portion.

16. The method of claim 12, wherein said step of aiming comprises adjusting pitch of said lamp portion.

17. The method of claim 12, wherein said step of aiming comprises adjusting roll of said lamp portion.

18. A grill light comprising:
a lamp portion rotatable about two perpendicular axes; and a telescopic extension member, wherein said lamp portion is disposed at an end of said telescopic extension member; wherein said lamp portion has pitch and roll adjustability; and
a rotationally-slidable fastener, wherein said rotationally-slidable fastener facilitates said pitch adjustability, and wherein said rotationally-slidable fastener comprises an 'I' track and a 'C' retainer, wherein said 'C' retainer cooperatively engages said 'I' track, and wherein said 'C' retainer and said 'I' track are operatively associated, and wherein said 'C' retainer is selectively slidably disposed along said 'I' track.

* * * * *